United States Patent [19]

Hasler

[11] 3,950,466

[45] Apr. 13, 1976

[54] STABILISING SLEEVE

[75] Inventor: Robin Hasler, Hertford, England

[73] Assignee: Imperial Chemical Industries Limited, London, England

[22] Filed: July 19, 1973

[21] Appl. No.: 380,665

[30] Foreign Application Priority Data

Aug. 9, 1972 United Kingdom............... 37151/72

[52] U.S. Cl. .................... 264/89; 264/95; 264/209; 264/210 R; 264/237; 264/290 R; 425/72 R; 425/326 R
[51] Int. Cl.² .................... B29D 23/04; B29C 25/00
[58] Field of Search ... 264/95, 89, 209, 237, 210 R, 264/290; 425/326 R, 71, 72, 378

[56] References Cited
UNITED STATES PATENTS

| 2,987,767 | 6/1961 | Berry et al. ........................... 264/95 |
| 3,008,185 | 11/1961 | Goldman ............................ 264/169 |
| 3,325,575 | 6/1967 | Last .................................... 264/209 |
| 3,544,667 | 12/1970 | Ebert et al. ........................... 264/89 |
| 3,663,134 | 5/1972 | Coquelin .............................. 264/95 |
| 3,814,785 | 6/1974 | Reade ................................... 264/89 |

FOREIGN PATENTS OR APPLICATIONS 250,616   2/1963   Australia............................. 264/95

Primary Examiner—Jeffery R. Thurlow
Attorney, Agent, or Firm—Cushman, Darby & Cushman

[57] ABSTRACT

Method and apparatus for stabilising the position of a tubular film comprising an annular, gas-permeable arcuate sleeve through which a tubular film can be passed, and means to supply gaseous fluid under pressure inwardly through the sleeve to create a cushion of gas between the tubular film and sleeve.

The arcuate sleeve is suitably used in combination with a primary air-ring.

9 Claims, 4 Drawing Figures

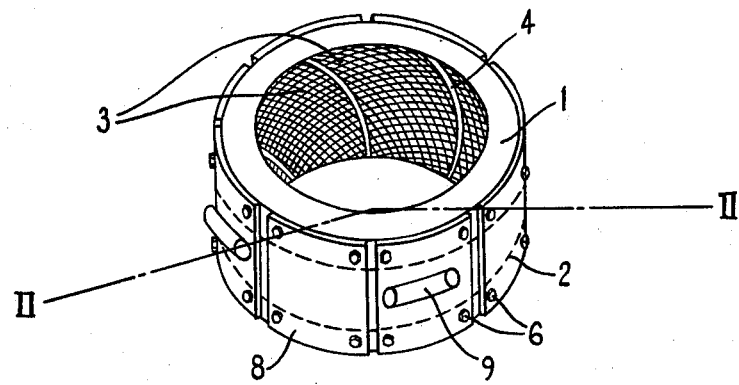
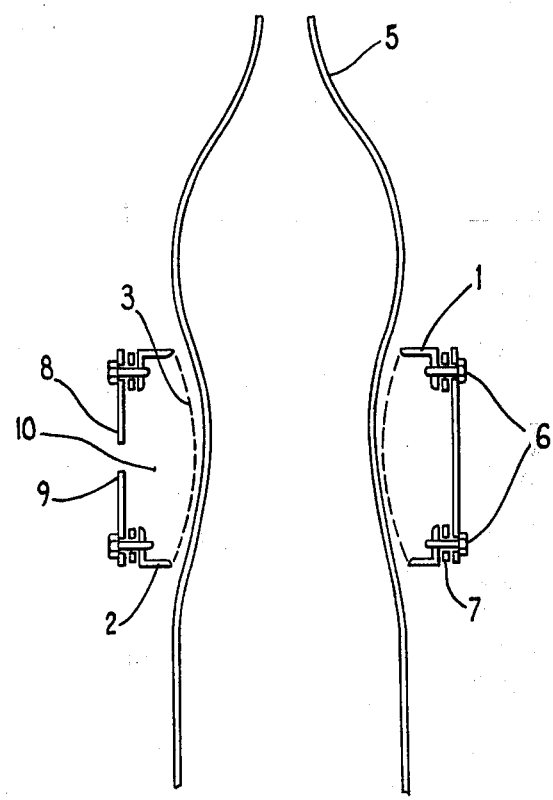

STABILISING SLEEVE

This invention relates to the production of tubular films, and, in particular, to a method and apparatus for stabilising the position of a tubular film.

Oriented tubular film is produced by extruding a relatively thick-walled thermoplastic tube from an annular orifice, and subsequently stretching the extruded tube, at a temperature below the melting temperature of the thermoplastic material, in the transverse and/or longitudinal directions to form a thin film, the stretching being effected in the transverse direction by means of internal gas pressure and in the longitudinal direction by withdrawing the tube at an accelerated rate in the direction of extrusion. In the case of oriented films produced from crystallisable polyesters, the polyester should be in a substantially amorphous state when stretched, and the extrudate must therefore be rapidly cooled, prior to reheating and stretching, to retain the polymer in the amorphous state. Likewise, in the formation of oriented films from crystalline polymers, such as poly-1-olefins, it is necessary to quench the extrudate to produce sufficient nuclei to ensure that individual spherulites remain small, thereby enabling the extruded tube to be readily stretched, when reheated, to yield a transparent film.

Tubular film having little or no orientation may be produced by a bubble process in which a relatively thick-walled thermoplastic tube in a substantially molten state is expanded by internal gas pressue immediately after the tube emerges from an extrusion orifice, i.e. without any intermediate quenching and reheating step. A technique of this kind is commonly employed in the production of tubular films from low density polyethylene, but a range of materials may be employed, for example — high density polyethylene, polyvinyl chloride, polyamides — such as polyhexamethylene adipamide, and polystyrene.

While the extruded polymeric material is at a relatively high temperature, the viscosity and tensile strength of the film tube are low, and when the film tube is expanded by internal gas pressure, there is a tendency, particularly during the production of biaxially oriented tubular film, for the film tube to be unstable and to wander from side to side. Not only is the film tube prone to rupture while in this unstable condition, but the instability may lead to marked variations in wall thickness of the resultant film. Various techniques have therefore been employed to stabilise the position of the hot, inflated film tube. For example, stabilisation has been effected by means of a closely fitting annular seal through which the tubular film is passed, the seal being in the form of a cylinder the internal surface of which is positioned parallel to the external surface of the tubular film, but contact of the tube with the cylindrical surface may give rise to scratching of the tube surface, and consequently to imperfect film.

Scratching of an inflated film tube, particularly a tube provided with a surface coating, such as a heat-sealable coating, has been encountered even with an annular seal fabricated from relatively soft materials, such as polyethylene terephthalate fabric or fibres.

We have now devised an improved stabilising sytem.

Accordingly, the present invention provides an apparatus for stabilising the position of a tubular film comprising an annular, gas-permeable sleeve through which a tubular film can be passed, and means to supply gaseous fluid under pressure inwardly through the sleeve to create a cushion of gas between the tubular film and sleeve, wherein the internal diameter of the sleeve is gradually decreased to a minimum value and subsequently increased in the direction of travel of the tubular film to provide a convex arcuate gas-permeable surface adjacent the tubular film.

The apparatus of the present invention is particularly suitable for stabilising the position of a tubular film which has been reheated, and expanded, to orient the film, by the introduction of a gas under pressure to within the film tube. Desirably, an expanded tube of this kind is cooled rapidly, by means of a primary cooling ring located at or adjacent the position at which the tube is expanded to its maximum diameter, to set the molecular structure of the film, and the present invention accordingly provides film stabilising apparatus including means for directing a uniform supply of cooling fluid against the surface of the tubular film, said means being positioned upstream of the annular sleeve in relation to the direction of travel of the film.

The present invention also provides a method of stabilising the position of a tubular film comprising passing a tubular film through an annular sleeve having a gas-permeable convex, arcuate surface disposed towards the film, and supplying gaseous fluid inwardly through the arcuate surface to create a cushion of gas between the film and arcuate surface to support the film out of contact with said surface.

The invention further provides a method of treating a tubular film comprising directing a uniform supply of cooling fluid against the external surface of the tubular film before passing the film into the annular sleeve.

In a preferred embodiment of the invention, cold gaseous fluid is supplied inwardly through the arcuate sleeve surface to assist cooling of the expanded film.

Although the invention is hereinafter described with specific reference to stabilising the position of an expanded tubular film or "bubble", it is to be understood that the invention is also applicable to other stages in the formation or treatment of a tubular film — for example, to control the position of a tubular film to which a surface coating has been applied.

Likewise, although the invention is herein described in terms of an arcuate sleeve presenting a circumferentially continuous permeable surface to the tubular film, the "sleeve" may also be circumferentially discontinuous. For example, the "sleeve" may comprise a plurality of discrete members, each with a permeable surface, disposed circumferentially around the tubular film, each permeable surface being curved not only in the direction of travel of the film but also in a direction normal thereto, so that the surface presents a convex curvature when viewed both in plan and in cross-sectional elevation. Provision of this bi-arcuate surface is necessary to prevent damage to the film should the latter expand or wander into the space between adjacent arcuate members.

The expression "circumferentially continuous gas-permeable surface", as herein employed, is intended to include an annular surface fabricated from a plurality of strips or sheets of gas-permeable material joined in edge to edge relationship to form a continuous surface, the joints in said surface, for example, welded joint area, being substantially impermeable to gas.

In a simple form of annular sleeve according to the invention, only those areas of the inner sleeve surface adjacent the ends of the sleeve need be flared or curved to present a convex, arcuate surface to the film, thereby to facilitate passage of the film to and from the sleeve, the remaining portion of the inner sleeve surface being of constant diameter throughout the length of the sleeve. However, to prevent damage to the film in such a system it is essential that a smooth transition be effected between the flared and constant diameter sections of the sleeve — for example by ensuring that the surface of constant diameter is tangential to the arcuate section, and in a preferred embodiment of the invention, the inner surface of the sleeve is uniformly curved throughout the length of the sleeve in the direction of travel of the film so that the sleeve, when viewed in cross-section, presents to the film a continuous arcuate gas-permeable surface uninterrupted by a surface parallel to that of the film.

The permeable sleeve surface is suitably fabricated from any material which permits the passage therethrough of a uniform supply of gaseous fluid to act as a lubricant between the sleeve and film. For example, the permeable surface may be of a metal such as mild steel or stainless steel suitably perforated to permit the passage of gas, the perforations being, for example, in the form of holes or elongated slots which are, preferably, uniformly distributed over the metal surface. Preferably the surface of the sleeve adjacent the film should be free from surface irregularities to minimize damage to the film surface where the layer of gaseous lubricant is thin.

Alternatively, the permeable surface may be in the form of a porous structure such as sintered bronze, ceramic, or particulate silica, but for ease of construction a surface fabricated from a wire mesh, particularly a stainless steel mesh, is preferred. A cylindrical sleeve of arcuate profile is conveniently fabricated from a plurality of strips or elements of mesh joined in end-to-end relationship — for example, by welding. Although such strips, before being shaped to provide the desired arcuate profile, may be of rectangular shape, we prefer to employ shapes approximating to that of a parallelogram so that when the strips are welded together, any minor irregularities in the welds will be inclined to the direction of travel of the film, thereby decreasing the possibility of damaging the film surface.

The pore size of the sleeve surface is not critical provided that the mesh permeability and supply of lubricating gas are such that a layer of lubricating gas of sufficient thickness to maintain the film clear of any irregularities on the sleeve surface is provided between the film and sleeve.

Gas, suitably air, under pressure may be supplied to the sleeve in any convenient manner — for example, by means of a number of individual gas chambers disposed around the sleeve, but is conveniently supplied from an annular pressure chamber or manifold surrounding, and in fluid-tight connection with, the sleeve. To aid uniform gas distribution within such a chamber, we prefer that a plurality of gas inlets, conveniently four in number, be uniformly distributed around the periphery of the chamber.

Gas supplied under pressure to the sleeve manifold flows through the permeable sleeve to create a cushion of gas between the film and sleeve, and it is preferred that the pressure of gas in this cushion, $P_c$, should be sufficient to prevent the film contacting the sleeve at any point.

Calculations by Blok and van Rossum, "Lubrication Engineering", December 1953, pages 316 to 320, have established that for a model foil bearing comprising a rigid journal rotating within a tensioned cellophane foil on a skin of lubricating oil retained between the journal and foil, the equilibrium between the hydrodynamic pressure $p$ in the oil skin, and the tension $\sigma$ in the foil, can be expressed as $p = \sigma/r$, where $r$ is the radius of the journal. Similar considerations are believed to apply to the sleeve system of the present invention, and, to avoid damaging the tubular film by contact with the arcuate sleeve, it is therefore preferred that the sleeve system is operated under conditions such that $P_c \geq T/R$, where $P_c$ is the pressure, expressed in pounds per square inch ($kgm^{-2}$), in the gas cushion between the film and sleeve, $T$ is the longitudinal tension, expressed in pounds per inch width of film ($kgm^{-1}$), in the film, and $R$ is the radius of curvature, expressed in inches ($m$), of the convex, arcuate sleeve surface.

The pressure of gas in the cushion between the film and sleeve required to maintain stable operating conditions therefore depends, at least to some extent, on the tension in the film and the radius of curvature of the arcuate sleeve, and is readily established by simple experimental techniques. For example, to stabilise the position of a tubular polypropylene film which has been oriented by inflation to a diameter in the range of 44 to 48 inches (1117 to 1219 mm) the internal pressure within the film being of the order of 5 inches water gauge [WG] (126 $kgm^{-2}$) the longitudinal tension in the film being of the order of 3 lb per inch (53.6 $kgm^{-1}$) of circumference, it has been found that with an arcuate mesh sleeve having a radius of curvature of from about 12 to 16 inches (305 to 406 mm), a pressure of gas of approximately 7 inches WG (176 $kgm^{-2}$) should be maintained in the cushion. This pressure is readily maintained, with a mesh sleeve having a permeability coefficient $\phi$ of $0.796 \times 10^{-6}$, by supplying gas to the sleeve manifold at a pressure of about 20 inches WG (506 $kgm^{-2}$). The mesh permeability coefficient is calculated from Darcy's equation:

$$\phi = vln/981 \, A \, p \, t,$$

where $v$ = volume of incompressible fluid (in ccs) flowing in time $t$ seconds.

$p$ = pressure drop across mesh in gms./sq.cm.

$A$ = effective area of mesh in sq.cm.

$n$ = absolute viscosity of fluid in centipoise.

$l$ = thickness of mesh in cms.

The internal diameter of the sleeve at its narrowest region, is suitably equal to the diameter of the expanded film, or within about ± 2 inches (51 mm) thereof, but, to reduce wander of the film, it is preferred that the smallest internal diameter of the sleeve should be from 0 to 10%, preferably 0 to 2.5%, less than that of the unsupported film, so that the film is temporarily "necked-in" or indented as it passes through the sleeve. For example, a film tube of diameter 45 inches (1143 mm), is conveniently stabilised within an arcuate sleeve having a minimum internal diameter of from about 44 to 45 inches (1117 to 1143 mm). The lower limit of sleeve diameter is to some extent determined by the elasticity of the film which will wrinkle if the elastic limit is exceeded.

To achieve adequate stabilisation, the length of the sleeve, in the direction of movement of the film, is preferably at least 0.2 times the minimum internal diameter of the sleeve.

The means for directing a uniform supply of cooling fluid against the expanded film which may be employed in combination with the arcuate sleeve of the invention, is conveniently in the form of a ring of pipes or slots so positioned as to direct cooling gas onto the "shoulder" region of the "bubble" which is formed when the tubular film is inflated. Alternatively, this primary cooling means may itself be in the form of a permeable annular sleeve, located in the "shoulder" region, and conveniently has an internal diameter greater than that of the arcuate sleeve to avoid contact with the heated, stretching film. The axial position of the primary cooling means relative to the arcuate sleeve is not critical, but, in practice, we prefer that the axial separation between the primary cooling ring and arcuate sleeve should be kept to a mininum, for example 2 to 3 inches.

As herein described the present invention is suitably employed to stabilise the position of an oriented, tubular film which has been produced by extruding a thermoplastic tube from an annular orifice, quenching the extrudate, reheating the tube to a temperature below is crystalline melting point, inflating the tube to introduce transverse orientation therein, and withdrawing the inflated tube in the machine direction at a rate such as will introduce longitudinal orientation in the tube, the oriented tube being subsequently, if desired, subjected to a heat-setting treatment to improve the dimensional stability of the oriented film. Conveniently, the arcuate sleeve of the present invention is positioned adjacent to or slightly up- or down-stream from the point at which the inflated tube achieves its maximum diameter.

The present invention is suitable for use in the production of tubular films by processes in which quenching of the film is effected by means of a cooled, internal mandrel, a typical dry mandrel process, which is particularly suitable for the production of tubular polyester films, being described in the complete specification of British Pat. No. 1,271,694 which relates to the production of film by melt extruding a tube of a thermoplastic material, withdrawing the tube over a cooled, matt-surfaced sizing mandrel which is of smaller diameter than the diameter of the extrusion orifice at a greater rate than the speed of extrusion of the tube, the mandrel being tapered over the length in which it is in contact with the tube to allow for the contraction of the tube as it cools to the solid state, passing the tube over a seal positioned within the tube at a point where it will not stick to the seal, heating the tube to its stretching temperature, and introducing gas under pressure to within the tube at a position beyond the seal, and finally collapsing the expanded tube.

A typical lubricated mandrel process suitable for the production of polyolefin films, to which the techniques of the present invention may be applied is described in the complete specification of British Pat. No. 1,284,321 which relates to the cooling of an extruded tube by passing an extruded tube over a cooling mandrel, continuously supplying a film of liquid to between the mandrel and the tube, maintaining, at the end of the mandrel remote from the extruder, a head of liquid capable of exerting pressure on the film of liquid, and withdrawing the liquid from the head, wherein the pressure of the liquid between the mandrel and the tube at any one point is greater than the pressure on the outside of the tube at that point.

The present invention is also applicable to stabilising the position of tubular films which have been quenched by an external "weir" system of the kind described in the complete specification of British Pat. No. 741,963.

The disclosures of the aforementioned British Pat. Nos. 741,963, 1,271,694, and 1,284,321 are incorporated herein by reference.

The present invention is also suitable for use in a blown-film system in which a film-forming material, such as polyethylene, is blown directly from an extrusion orifice.

Although the techniques of the present invention may be employed to stabilise the position of tubes derived from any tube-forming materials, the techniques are preferably employed in relation to the production of tubular films from any thermoplastic polymeric material, and particularly in the production of films and tubes from crystalline or crystallisable polymers. For example, polymers and copolymers of 1-olefins such as high density polyethylene, polypropylene or ethylene propylene copolymers, of poly-4-methyl pentene-1, of polyesters such as polyethylene terephthalate and polyethylene-1,2-diphenoxyethane-4,4'-dicarboxylate, of polysulphones, and of the various nylons may be processed. Coated films, particularly melt- or extrusion-coated or solution-coated films, may also be processed, and the invention is of particular value in handling any film the surface of which is susceptible to scratching.

The invention is illustrated by reference to the accompanying drawings in which:

FIG. 1 is a simplified perspective view of an arcuate sleeve,

FIG. 2 is a schematic side elevation of the sleeve along the line II—II of FIG. 1, the sleeve being depicted in relation to a inflated tubular film.

Figure 3:
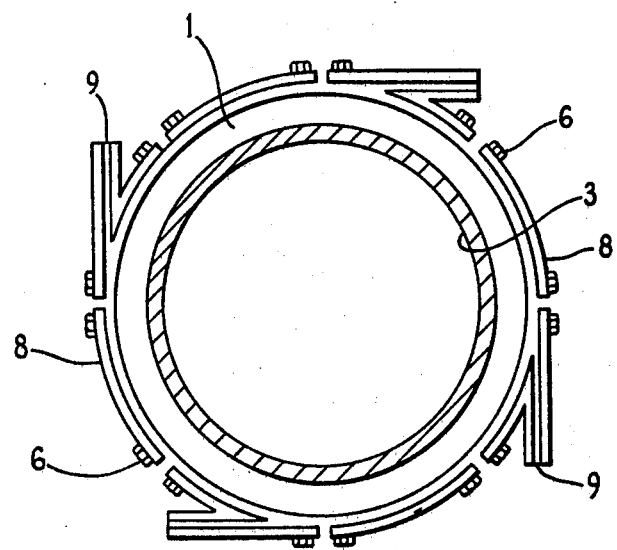
FIG. 3 is a schematic plan view of an arcuate sleeve and, FIG. 4 is a schematic elevation depicting a combined cooling ring and arcuate sleeve used in relation to a lubricated mandrel system for the production of oriented tubular film.

Referring to FIGS. 1 to 3 of the drawings, an arcuate sleeve comprises a cylindrical framework fabricated from a pair of circular members 1, 2 each of 1194 mm internal diameter and of right angled mild steel sections (~76 × 51 × 6 mm) spaced axially apart a distance of approximately 305 mm by eight equispaced braces (not shown) each of mild steel tee section (51 × 51 × 6 mm).

Disposed between the circular members to form an inwardly curved arcuate surface having a radius of curvature, in the direction of travel of the film, of 305 mm, and a minimum internal diameter of 1127 mm, is a number of panels 3 of rigid stainless steel Hollander-weave mesh, having a pore size of 20 microns, jointed in end-to-end relationship by welds 4 which are inclined to the vertical axis of the sleeve, and polished smooth, to prevent localised damage to a thermoplastic tube 5 located within the sleeve.

Secured around the periphery of the framework by bolts 6, and rubber gaskets 7, are eight metal cover plates 8 each of mild steel (~508 × 279 × 3 mm), alternate plates being provided with an inlet port 9 for the supply to the sleeve of gas or air under pressure.

In operation to stabilise the position of an expanded tubular film, as depicted schematically in FIG. 2, air is supplied through each of the inlet ports 9 to a chamber or manifold 10 within the sleeve unit at a pressure of about 20 inches WG, (506 kgm$^{-2}$), the sleeve being located adjacent the shoulder of the inflated film within which an air pressure of about 5 inches WG (126 kgm$^{-2}$) is maintained. Air escaping from the manifold through mesh surface 3 creates an air cushion between the mesh and tubular film, the pressure of air in this cushion being sufficient, approximately 7 inches WG (176 kgm$^{-2}$), to keep the film out of contact with the mesh surface. The tubular film is thus slightly indented as it passes through the sleeve, the extent of this indentation being magnified in FIGS. 2 and 4 for clarity, and is thereby effectively stabilised against lateral movement.

The difference in air pressure between the interior of the tubular film and that of the cushion between the film and sleeve is balanced by the tensional forces in the wall of the film itself.

Figure 4:
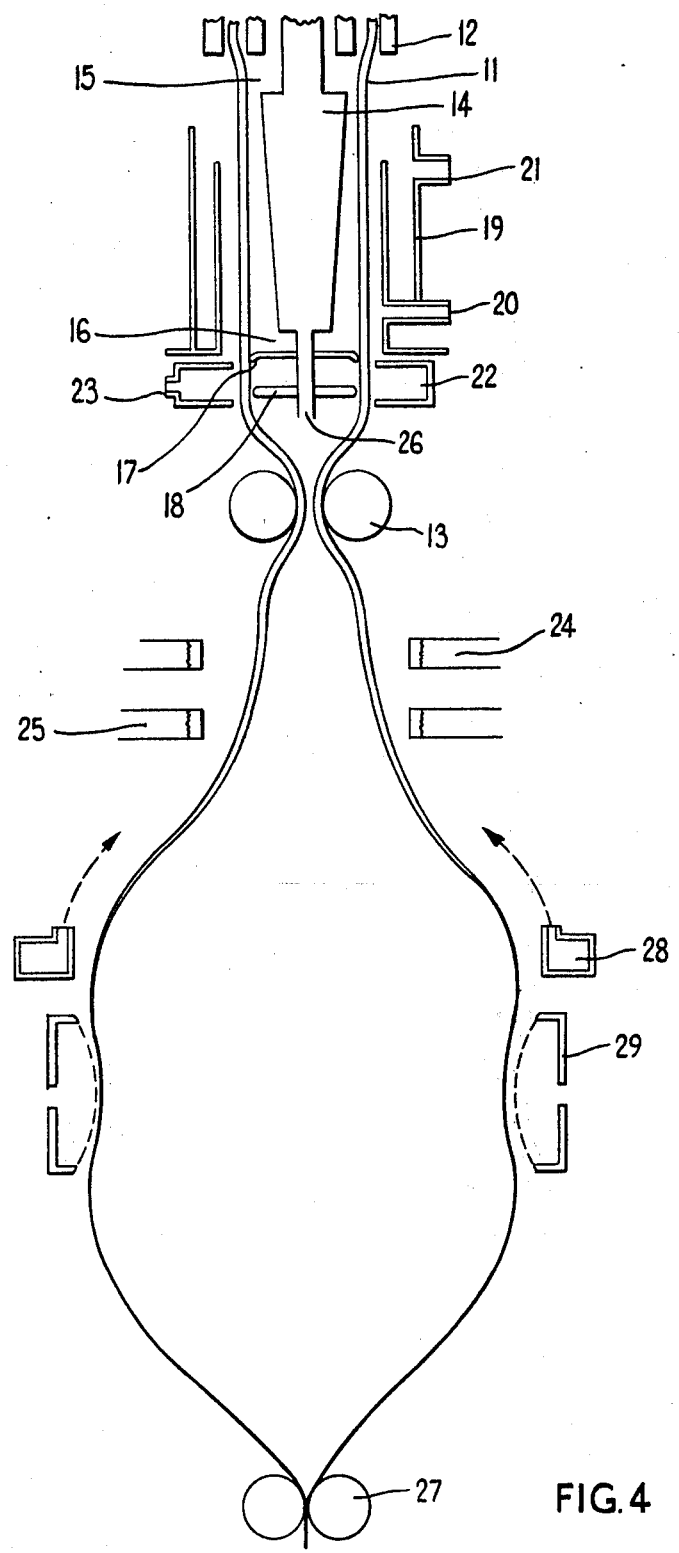

Referring to FIG. 4, which depicts a film-forming apparatus employing a lubricated mandrel of the kind particularly suitable for the production of polyolefin films a tube of thermoplastic material 11 is shown being extruded from an annular extrusion die 12. The tube is withdrawn from the extrusion die by a pair of contrarotating nip rolls 13 which are of width less than the collapsed tube. The rolls 13 withdraw the tube at a rate greater than that at which it is extruded, thus hauling the tube down on to a cooling mandrel 14 situated inside the tube. Water is supplied to between the tube and the mandrel by maintaining a small head of water in the space 15 at the top of the mandrel. Water is therefore carried down between the mandrel 14 and the tube 11 into the space 16 formed between the bottom of the mandrel and a resilient sealing member 17. Water is removed from this space through a pipe (not shown) which passes through the centre of the mandrel.

Below sealing member 17 is positioned a circular sponge 18 which contacts the inside of the tube 11 to remove any moisture which passes the seal. This moisture is removed from the sponge 18 by applying vacuum through a suction pipe (not shown).

In practice an intermediate sealing member is usually positioned between sealing member 17 and sponge 18 together with means to pressurise the tube in this region, and to control the extent to which water from space 16 penetrates between the mandrel and the tube, but these details are omitted to clarify the drawing.

As well as being cooled internally, the tube 11 is cooled externally by passage through a water bath 19 which surrounds the tube. Water is continually introduced into the water bath through pipe 20 and flows out through pipe 21. After passing through the water bath, the tube passes through a chamber 22 where vacuum is applied to the outside of the tube through pipe 23 to remove any water from the outside of the tube.

The cooled tube then passes through the pair of nip rolls 13 which control the speed at which the tube is travelling, and through banks of infra-red heaters 24 and 25 which raise the temperature of the tube to that required for stretching. The tube is then stretched in the direction transverse to its direction of extrusion by air under pressure introduced to within the tube through pipe 26, and is simultaneously stretched longitudinally by a pair of nip rolls 27 which form an air tight seal across the tube, and withdraw the tube at a rate greater than that at which it is withdrawn from the extrusion die by the nip rolls 13.

The shoulder of the inflated tube is cooled by cold air delivered in the direction of the arrows from a primary cooling ring 28 located at the region where the tube attains its maximum diameter, and the lateral position of the inflated tube is controlled by the arcuate sleeve system 29.

The present invention is further illustrated by the following Example in which a coated, biaxially oriented polypropylene film was produced using an apparatus of the type illustrated in FIG. 4.

EXAMPLE

From a triple channel annular die, having a central channel of diameter 6.5 inches (165 mm) and die gap of 0.060 inches (1.52 mm), were coextruded a propylene homopolymer, at a rate of 520 lbs (230 kg) per hour, and a random ethylene/propylene copolymer, to form a polypropylene tube the internal and external surfaces of which were coated with a layer of the random copolymer.

The top of the mandrel was 1 inch (25.4 mm) from the extrusion die, and the mandrel had a diameter of 6.25 inches (158.7 mm) at the top, had a matt surface, was 48 inches (1.22 meters) long and was 6.125 inches (155.6 mm) in diameter at its bottom end. Water was supplied to the gap 15 between the extrusion die and the mandrel so that a film of water was carried down between the tube and the mandrel. The mandrel itself was internally cooled by cold water.

The tube was drawn down over the mandrel by means of nip rolls 13 which collapsed the tube only at its centre and which rotated at a peripheral speed of 23 ft/minute (0.117 ms$^{-1}$). Simultaneously, the outside of the tube was cooled by the cooling bath to which cooling water was supplied through pipe 20 at a rate of 700 gallons per hour (3185 dm$^3$h$^{-1}$). The top of the water bath was 11 inches (279 mm) above the bottom end of the mandrel.

After passage through the rolls 13 the tube was heated to a temperature of about 160°C by infra-red heaters 24 and 25, and stretched in the direction transverse to its direction of extrusion by air at a pressure of 5 inches water gauge (126 kgm$^{-2}$) introduced through pipe 26, the tube being expanded to a diameter of 45.25 inches (1149 mm). The tube was also stretched in its direction of extrusion by nip rolls 27 which withdrew the expanded tube at a speed of 195 feet per minute (0.99 ms$^{-1}$).

The expanded tube was withdrawn through cooling ring 28 and stabilised by means of sleeve 29 located 12 inches (305 mm) below the outlet of ring 28, and having a minimum internal diameter of 44.375 inches (1127 mm), the arcuate surface having a radius of curvature of 12 inches (305 mm). Air at a temperature of 20°C was fed to the sleeve at a pressure of 20 inches WG (506 kgm$^{-2}$).

The resultant coated, biaxially oriented polypropylene film was substantially free from surface imperfections such as scratches, and had a Gardner Haze, measured according to ASTM D1003-61(1970), of 1.9%. An identical film produced on the same equipment, but with an annular seal lined with soft polyethylene terephthalate fibres in place of sleeve 29, was observed, on visual inspection, to have a very badly scratched surface, and to have a Gardner Haze, measured by the same test method, of 2.7%.

I claim:

1. Means for stabilizing the position of a tubular film travelling in a given direction without mechanically contacting or damaging the film, said means comprising an annular sleeve through which the tubular film can be passed, said sleeve providing around the periphery of the tubular film a circumferentially continuous gas-permeable surface the internal diameter of which is gradually decreased to a minimum value and subsequently gradually increased in the direction of travel of the tubular film to provide adjacent the tubular film a convex arcuate gas-permeable surface which is uniformly curved throughout its length in the direction of travel of the tubular film, and means for supplying gas under pressure inwardly through said surface to create a cushion of gas between the tubular film and said surface.

2. Means according to claim 1 wherein the radius of curvature, R, of the arcuate gas-permeable surface is such that $Pc \geq T/R$, where Pc is the pressure in the gas cushion between the tubular film and sleeve, and T is the longitudinal tension in the film, Pc, T, and R being expressed in mutually consistent units.

3. Means according to claim 1 comprising means for directing a uniform supply of cooling fluid against the external surface of the tubular film, said directing means being disposed upstream of the annular sleeve in relation to the direction of travel of the film.

4. Means for stabilizing the position of a tubular film travelling in a given direction without mechanically contacting or damaging the film, said means comprising an annular, gas-permeable sleeve through which the tubular film can be passed, said sleeve comprising a plurality of discrete members each with a gas-permeable surface disposed circumferentially around the tubular film, each of said gas-permeable surfaces being uniformly curved throughout its length in the direction of travel of the film, and also in a direction normal thereto, whereby each of said surfaces presents a uniform convex curvature to the tubular film when viewed both in plan and in cross-sectional elevation, and means for supplying gas under pressure inwardly through each of said surfaces to create a cushion of gas between the tubular film and each of said surfaces.

5. A method of forming a tubular film comprising the steps of extruding a tube of a thermoplastic polymeric film-forming material, establishing the movement of said tube in a given direction, cooling said extruded tube while controlling the rate at which said tube is travelling, reheating said cooled tube to an orienting temperature, introducing transverse orientation into said reheated tube by inflating it to form a tubular film, stabilizing the position of said tubular film without contacting said tubular film with mechanical means and without inflicting damage thereto by passing said tubular film through an annular sleeve located around the periphery of said tubular film in the region in which said tubular film attains its maximum diameter, said sleeve providing adjacent the tubular film a circumferentially continuous gas-permeable convex arcuate surface which is uniformly curved throughout its length in the direction of travel of said tubular film, supporting said tubular film out of contact with said surface of said sleeve without completely collapsing said inflated tubular film by supplying gas inwardly through the arcuate surface of said sleeve to create a cushion of gas between said tubular film and said arcuate surface and introducing longitudinal orientation into said tubular film by collapsing and withdrawing said inflated tubular film at a rate greater than said controlled rate of travel.

6. A method according to claim 5 comprising supplying cold gaseous fluid inwardly through the arcuate surface.

7. A method according to claim 5 comprising maintaining a pressure of gas Pc in the gas cushion such that the relationship $Pc \geq T/R$ is satisfied, where T is the longitudinal tension in the film and R is the radius of curvature of the arcuate surface, Pc, T, and R being expressed in mutually consistent units.

8. A method according to claim 5 comprising directing a uniform supply of cooling fluid against the external surface of the tubular film before passing the film into the annular sleeve.

9. A method according to claim 5 wherein said cooling is effected by withdrawing said extruded tube at a controlled rate over an internal cooling mandrel.

* * * * *